Oct. 27, 1970   S. BOWMAN   3,535,945
FLUID DRIVE FOR HIGH INERTIA LOADS
Filed June 10, 1968   6 Sheets-Sheet 1

INVENTOR.
SPENCER BOWMAN
BY Bosworth Sessions
Herrstrom + Cain
ATTORNEYS

Oct. 27, 1970　　　　　S. BOWMAN　　　　　3,535,945
FLUID DRIVE FOR HIGH INERTIA LOADS
Filed June 10, 1968　　　　　　　　　　　　　　6 Sheets-Sheet 3

INVENTOR.
SPENCER BOWMAN
BY Bosworth Sessions
Herrstrom + Cain
ATTORNEYS

Oct. 27, 1970     S. BOWMAN     3,535,945

FLUID DRIVE FOR HIGH INERTIA LOADS

Filed June 10, 1968     6 Sheets-Sheet 4

INVENTOR.
SPENCER BOWMAN
BY Bosworth Sessions
Herrstrom & Cain
ATTORNEYS

United States Patent Office 3,535,945
Patented Oct. 27, 1970

3,535,945
FLUID DRIVE FOR HIGH INERTIA LOADS
Spencer Bowman, Lakewood, Ohio, assignor to Rotek Incorporated, Ravenna, Ohio, a corporation of Ohio
Filed June 10, 1968, Ser. No. 735,679
Int. Cl. F16h *39/10*
U.S. Cl. 74—129                5 Claims

ABSTRACT OF THE DISCLOSURE

A fluid operated gearless drive for high inertia loads such as rotary loads which swing in a horizontal plane on turntables, slewing rings and the like. A flat rim is secured to the load and a pair of spaced double-acting series-connected reciprocating fluid motors are provided to grip and drive the rim in consecutive alternating strokes. The piston rods for the motors carry fluid operated caliper-type clutch jaws which engage the rim during the drive stroke and release during the return stroke.

BACKGROUND OF THE INVENTION

My invention relates to drives for high inertia loads such as rotary loads which swing in a horizontal plane such as on turntables and slewing rings having a vertical axis of rotation, and especially to rotary drives associated with mobile equipment having swinging booms or arms such as cranes, back hoes and the like. More particularly my invention relates to gearless-type drives which may be operated by the standard engine driven hydraulic system normally provided on the vehicle on which the high inertia load is carried.

Rotary drives of this type typically use a relatively high-speed prime mover coupled to the turntable or slewing ring through reduction gearing. Gear reduction units however, since they must be machined with considerable precision, are relatively expensive and are bulky and cumbersome for the amount of power they deliver. Furthermore they require continuous protection from dust, dirt and moisture and cannot be easily removed for repairs.

Also where extremely accurate positioning of a swinging crane boom is required the gear driven type mechanism must normally be provided with brakes both to provide for positive stopping by operator control and to prevent swinging of the boom when stopped.

The present invention reduces the disadvantages indicated above and affords other features and advantages not obtainable from the prior art.

SUMMARY OF THE INVENTION

It is among the objects of my invention to eliminate reduction gearing in drives for high inertia loads such as rotary loads carried by turntables, slewing rings and the like, or loads which move in a linear path of travel.

Another object is to reduce the size and weight of a rotary drive for rotary loads adapted to turn about a fixed vertical axis.

A further object is to accurately locate and lock a turntable or slewing ring with a high-inertia rotary load at a fixed position relative to its support.

Still another object is to turn a high inertia rotary load mounted on a mobile chassis with fluid pressure from a service fluid system typically associated with the mobile equipment.

These and other objects are accomplished by means of a drive comprising a flat drive rim affixed to the load, the load and rim normally being supported on a base by suitable bearings. A pair of spaced double-acting fluid cylinders are mounted on the base and each has a piston rod or operating rod adapted for reciprocating movement through alternating drive and return strokes to advance the rim. Each piston rod or operating rod has a fluid-operated caliper-type clutch at its outer end adapted to grip the rim between its jaws during the drive stroke. The cylinders work in reverse phase with respect to one another to drive the rim with uniform alternating drive strokes.

In the preferred form the cylinders are connected to one another at corresponding ends thereof by a hydraulic line so that fluid exhausted from one cylinder is used to drive the other cylinder and the fluid under pressure is switched from one cylinder to the other at the end of each stroke by an automatic control valve which is switched or tripped by on of the piston rods. An open-center four-way valve is used to control the direction of the drive rim or to positively stop the rim at a desired position.

Other objects, uses and advantages of the invention will be apparent from the following detailed description and drawings.

DESCRIPTION OF THE PREFERRED EMBODIMENT

Figure 1:
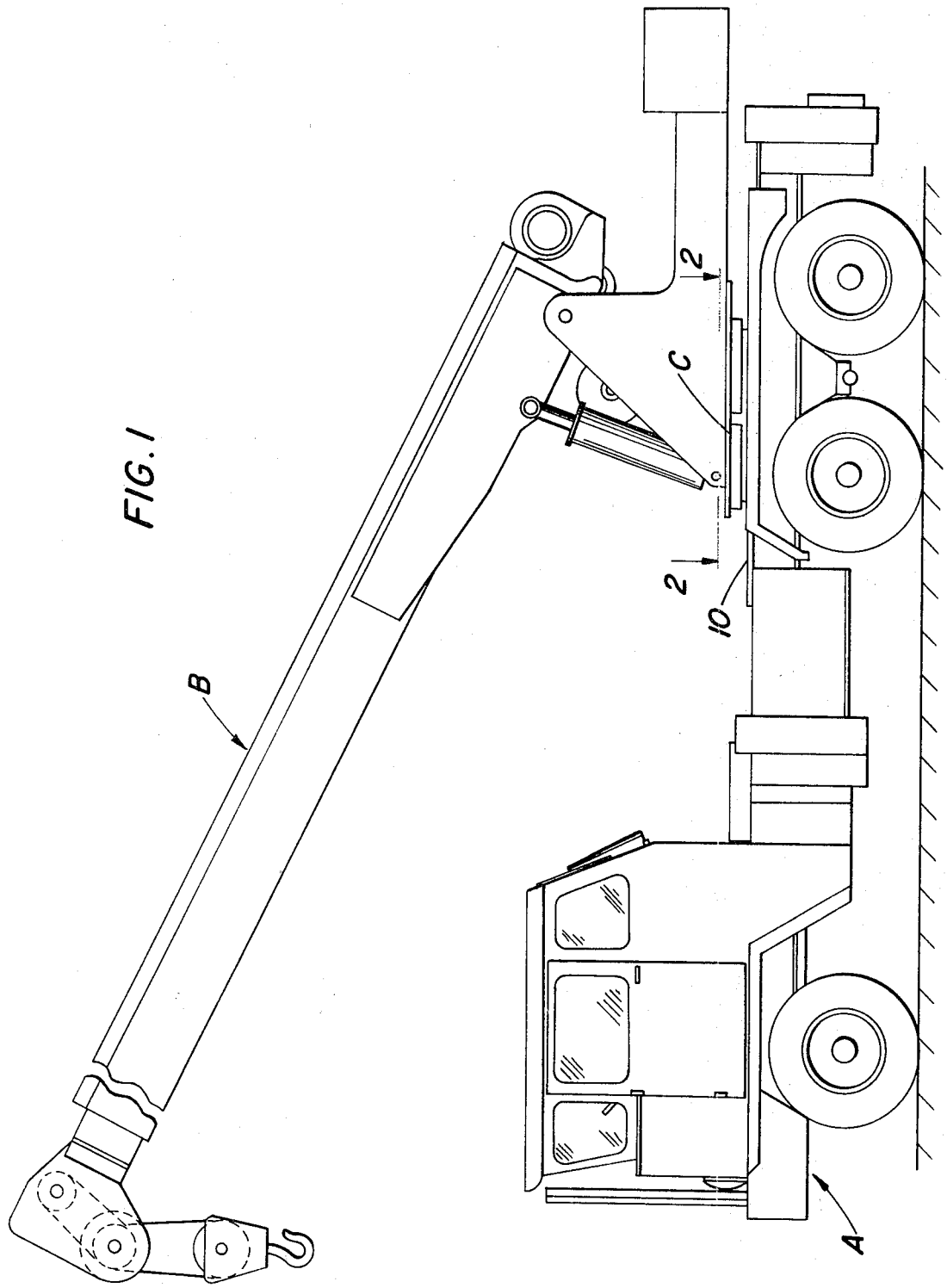
FIG. 1 is a side elevation of a mobile crane with a swinging boom turned by a gearless rotary drive embodying the invention.

Referring more particularly to the drawings, FIG. 1 shows a mobile crane truck A having a swinging boom B mounted on a rotary table C which is used to swing the boom through 360° of rotary travel during its operation. The rotary table C is turned on the truck A by a gearless hydraulic rotary drive embodying the invention, which uses fluid pressure from the truck's standard service hydraulic system.

Figure 2:
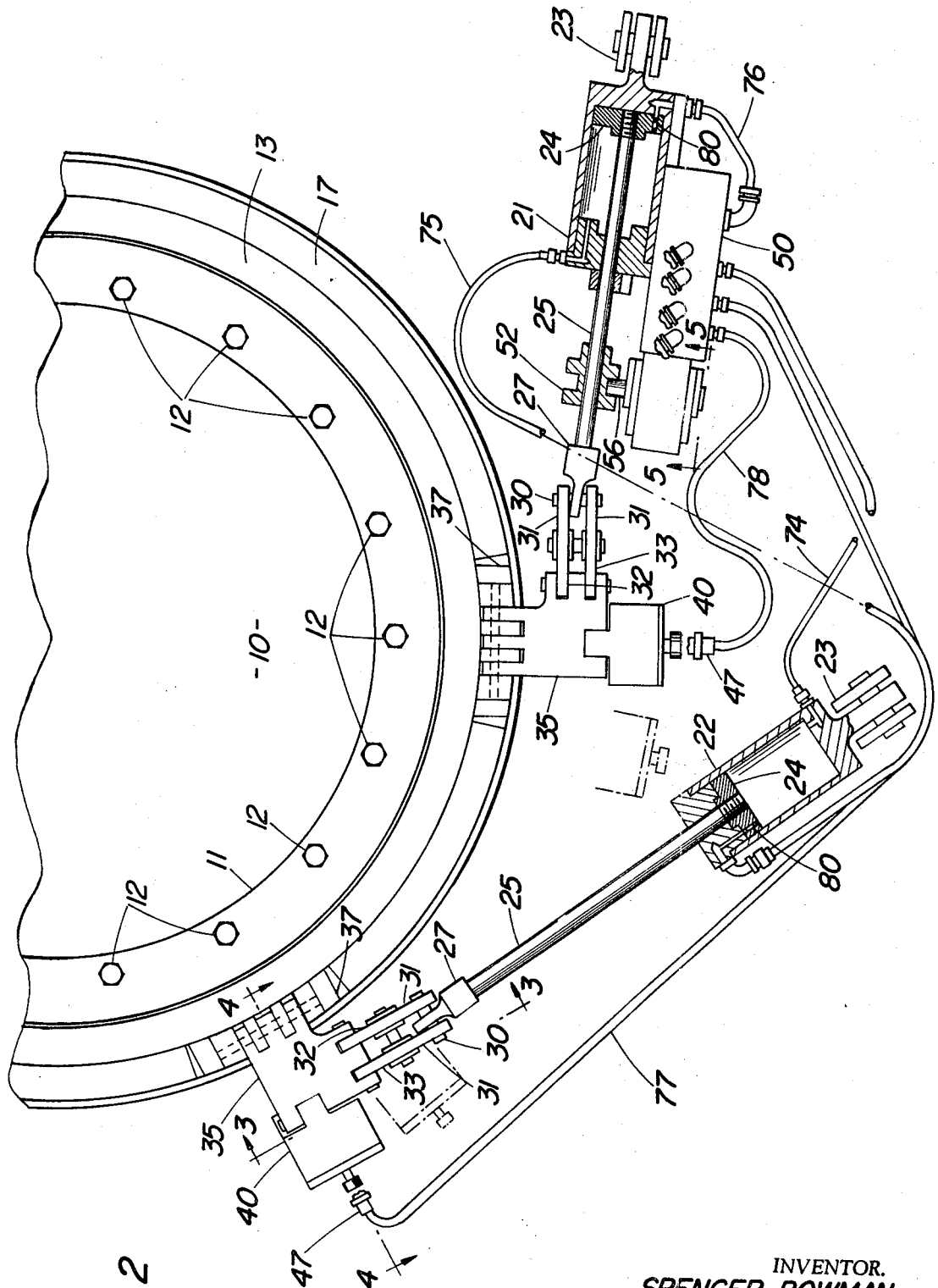
FIG. 2 is a fragmentary horizontal sectional view on an enlarged scale showing the crane turntable and the rotary drive mechanism of the invention.

The drive mechanism is mounted on the truck chassis 10 (FIG. 2) and includes an annular bearing ring 11 fastened to the chassis 10 by bolts 12, and a slewing ring 13 mounted to encircle the bearing ring 11. The slewing ring 13 turns on ball bearings 14 which ride in an annular race 15 formed in the bearing ring 11 and the rotary table C is secured to the ring 13 by volts 16. A flat annular clutch rim 17 at the outer circumference of the slewing ring 13 is adapted to be gripped by the rotary drive mechanism to provide the rotary drive for the table C in a manner to be described below.

Mounted on the chassis 10 are two fluid motors or drive cylinders 21 and 22 pivotly connected at one end to brackets 23 secured to the chassis. Each cylinder has a piston 24 secured to the inner ends of piston rods 25 and 26 respectively which transfer motive force to the clutch rim 17.

Figure 3:
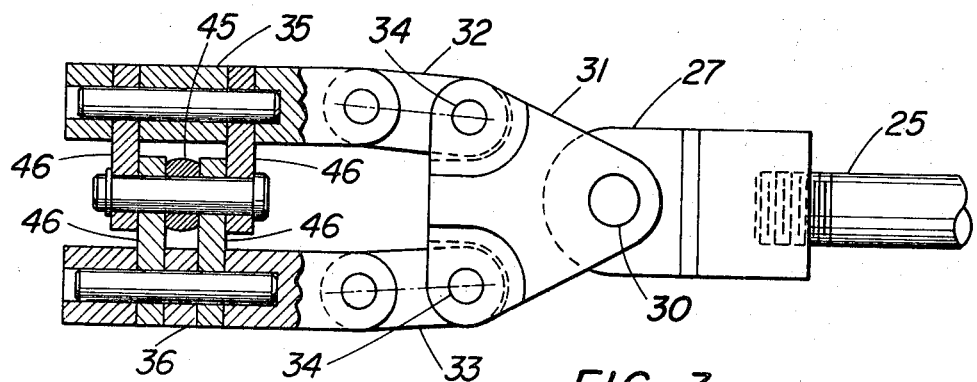
FIG. 3 is a fragmentary sectional view taken on the line 3—3 of FIG. 2 and showing the caliper-type clutches which grip the rim.

Received on the end of each piston rod 25 and 26 is an eye bolt 27 (FIG. 3) having a spherical bearing which receives a pivot pin 30 to provide a limited universal connection. Two pivot arms 31 which form a clevis are pivotally mounted on each outwardly extending end of the pin 30 and a pair of non-parallel links 32 and 33 are connected to each arm 31, by pivot pins 34. This arrangement permits the links 32 and 33 of each pair to pivot in opposite directions but prevents parallel swinging movement.

Figure 4:
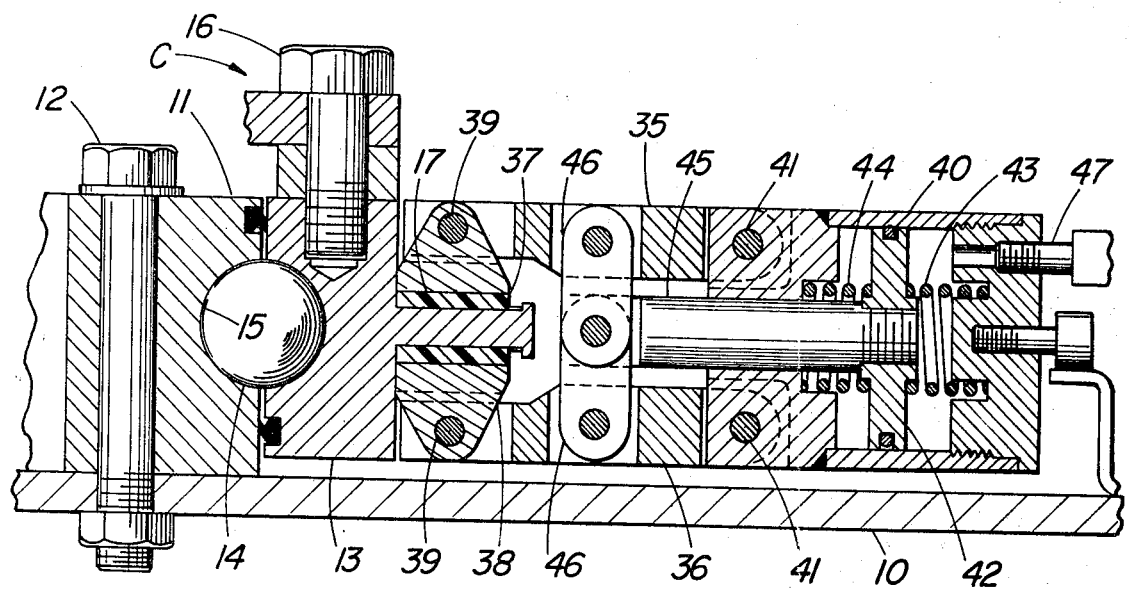
FIG. 4 is a fragmentary sectional view taken on the line 4—4 of FIG. 2 and showing the toggle arrangement for operating the caliper-type clutches.

Pivotally connected to the other ends of the corresponding links 32 and 33 of each pair are opposed clutch jaw carriers 35 and 36 respectively. Each jaw carrier 35 and 36 carries a clutch jaw 37 respectively, which engages the clutch rim 17 on opposite sides thereof (FIG. 4). The clutch jaws 37 and 38 are of elongated arcuate form and are pivotally connected to the jaw carriers 35 and 36 by pins 39.

Located at the opposite ends of the jaw carriers 35 and 36 is a clutch cylinder 40 to which the opposed clutch carriers 35 and 36 are pivotally connected by pins 41. Each cylinder 40 has a fluid operated piston 42 which is biased to an intermediate position by means of opposed helical springs 43 and 44. The piston rod 45 extends between the opposed clutch carriers 35 and 36 and is pivotally connected to the ends of toggle links 46. The toggle links 46 are connected at their opposite ends to the jaw carriers 35 and 36 so that extension of the piston rod 45 serves to pull the jaw carriers 35 and 36 toward one another to bring the opposed clutch jaws 37 and 38 into gripping engagement with the rim 17. Accordingly the clutch jaws will be engaged whenever fluid pressure is supplied to the cylinder 40 through the fitting 47. However, when the pressure is relieved the spring 44 will return the piston to its neutral position while at the same time forcing fluid out of the cylinder chamber back to a reservoir through the fitting 47.

The toggle arrangement provides a considerable force multiplication from the piston 42 to the clutch jaws 37 and 38 so that an exceptionally high gripping pressure can be obtained with a relatively low fluid pressure. This is particularly important since it enables the drive to operate effectively with adequate rim gripping pressure even though the vehicle engine which drives the fluid pump is operating at idle speed and minimal fluid pressure is available in the system.

Figure 5:
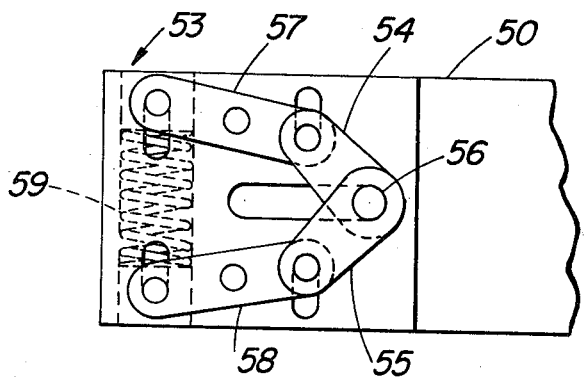
FIG. 5 is a fragmentary sectional view taken on the line 5—5 of FIG. 2 showing the automatic trip valve for switching fluid pressure from one cylinder to the other at the end of each stroke.
Figure 6:
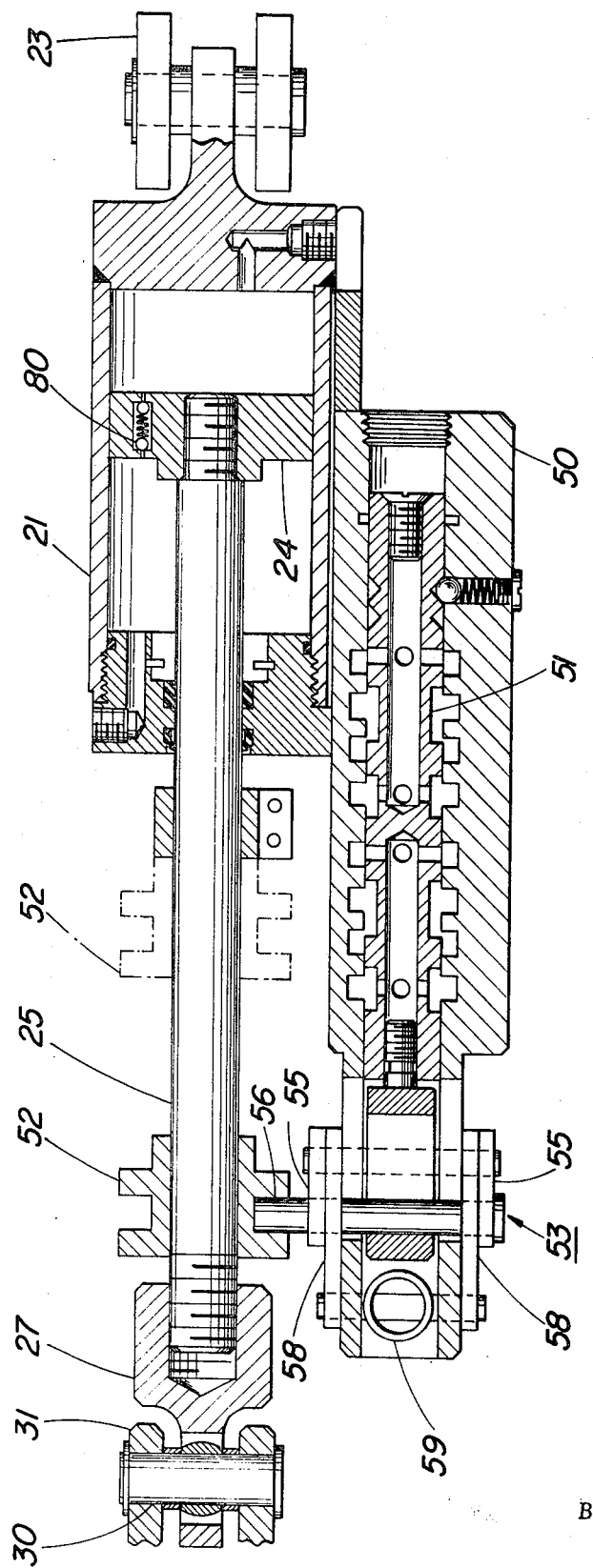
FIG. 6 is a horizontal sectional view showing the control valve and the drive cylinder to which it is attached.

The control of the drive cylinders 21 and 22 and the clutch cylinders 40 is accomplished by a double four-way control valve 50 which is fastened to the cylinder 21 (FIG. 6). The valve spool 51 is reciprocated through about a ¼ inch travel between two positions by means of a trip arm 52 slidably mounted on the piston rod 25. As the piston rod 25 reaches the forward and rearward limits of its travel the trip arm 52 engages and operates an over-center trip device 53 (FIG. 5) which changes the position of the spool and reverses the flow of fluid to the drive cylinders 21 and 22 while at the same time de-energizing one of the clutch cylinders 40 and actuating the other.

The trip device 53 comprises a pair of toggle links 54 and 55 connected by a central pin 56 which is received in a slot in an operating rod connected to the valve spool 51. The opposite ends of the toggle links 54 and 55 are connected to the ends of levers 57 and 58 by pins welded to the links 54 and 55. The pin should be welded to prevent binding due to the couple acting on the pin 56. The opposite ends of the levels 57 and 58 which are pivoted about midway between their ends, are urged apart by means of a helical spring 59 to shift the pin 56 to either one limiting position or the other and thus resist movement of the pin 56 towards the center position of the toggle.

FIG. 6 shows the piston rod 25 midway through a retraction stroke and accordingly the trip arm has been moved to the left to move the pin 56 over center to the left or to its over center position opposite to he position shown in FIG. 5. While this travel of the pin 56 between over center positions is about ¾ inch, the travel of the valve spool 51 is only about ¼ inch because the pin is slidably connected to the valve spool in a slot so that the pin 56 moves the spool only during the terminal portions of its movement. This provides a rapid switching to minimize the dwell time when the pistons of the power cylinders 21 and 22 reach the limits of their reciprocating movement.

OPERATION

FIGS. 7 to 10 illustrate schematically the operation of the hydraulic system. In the various diagrams hydraulic lines having fluid pressure are shown in wide solid lines, hydraulic lines returning fluid to the reservoir are shown in wide empty lines, and hydraulic lines with no fluid movement are shown in thin lines. The system includes a hydraulic pump 60 which is driven for example by the prime mover for the vehicle such as a diesel engine. Normally the pump 60 will supply fluid under pressure to other vehicle systems as well, however, for the purpose of illustration the diagrams show its use limited to the rotary drive. The system includes as conventional elements a sequence valve 61 which maintains a minimum pressure of about 150 p.s.i. in the clutch cylinder 40, and a pressure reducing valve 62 which limits the pressure to about 300 p.s.i. and bleeds excess pressure to a fluid reservoir 63. The fluid from the pump 60 is directed under pressure through one line 65 directly to the over-center control valve 50 and through another line 66 to a selector valve 70 located in the operator's cab. Fluid may be returned to the reservoir 63 through one line 67 from the control valve 50 and through another line 68 from the selector valve 70.

The selector valve 70 is movable by means of a control handle 71 between a forward position (FIGS. 7 and 8), a reverse position (FIGS. 9 and 10) and a stop or neutral position (not shown).

Figure 7:
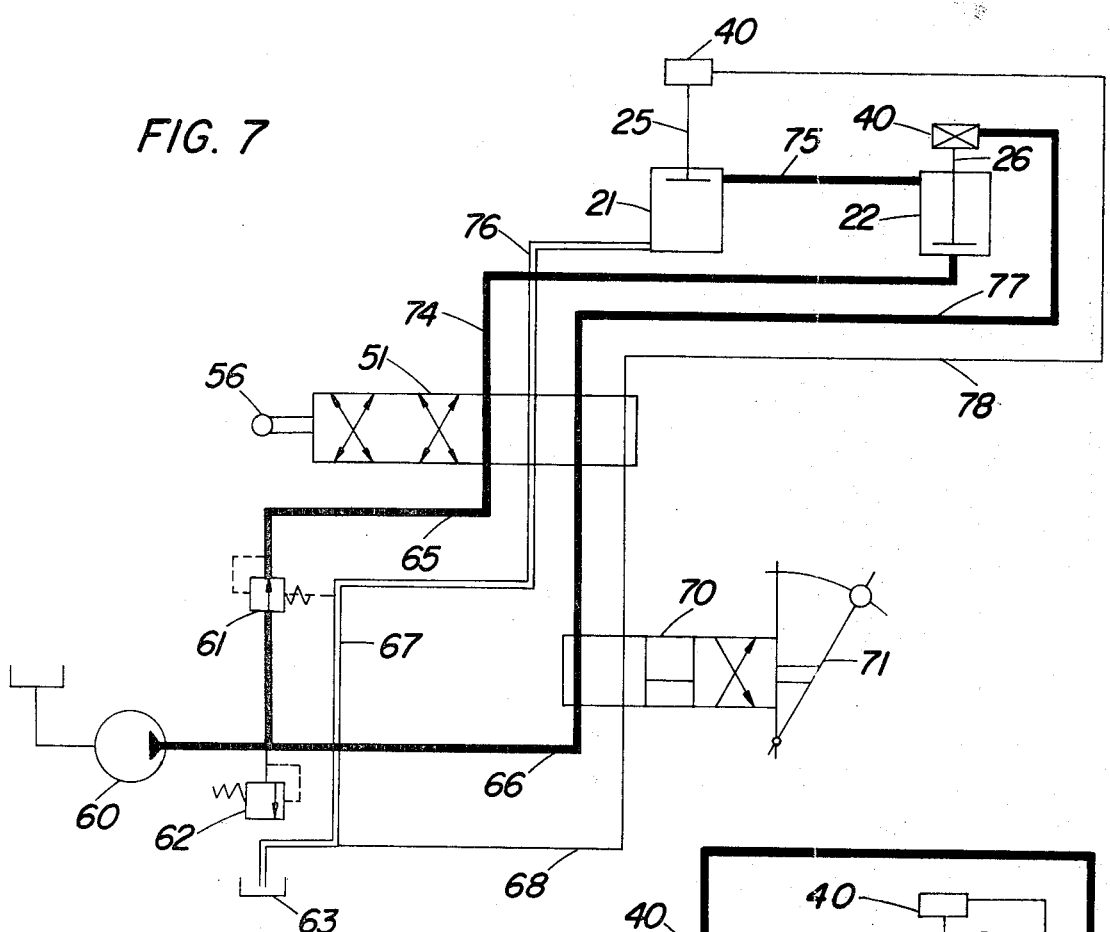
FIGS. 7 to 10 are schematic diagrams of the fluid control system showing the conditions during various phases of the operation of the rotary drive.

FIG. 7 shows the selector handle 71 in the forward position and the valve 50 in one of its two positions whereby fluid under pressure is being transmitted through the line 65 to a line 74 leading to the rearward end of the cylinder 22. Accordingly this will cause the piston rod 26 to move through a drive stroke and fluid being exhausted from the upper end of the cylinder 22 will be forced through a hydraulic line 75 which connects the forward ends of the two cylinders 21 and 22. Since this fluid in the line 75 is under pressure it provides a fluid transfer and pressure relay between the two cylinders and thus moves the piston 24 of the cylinder 21 through its retraction stroke to retract the piston rod 25. Fluid from the rearward end of the cylinder 21 will flow through a line 76 to the control valve 50 and thence through the line 67 to the reservoir 63.

During the drive stroke of the piston 24 of the cylinder 22, pressure in the line 66 will be passed through the selector valve 70 to a line 77 which connects with the clutch cylinder 40 mounted at the end of the piston rod 26. Accordingly the respective clutch jaws 37 and 38 will engage the clutch rim 17 during this part of the cycle to turn the rim clockwise as viewed in FIG. 2.

Figure 8:
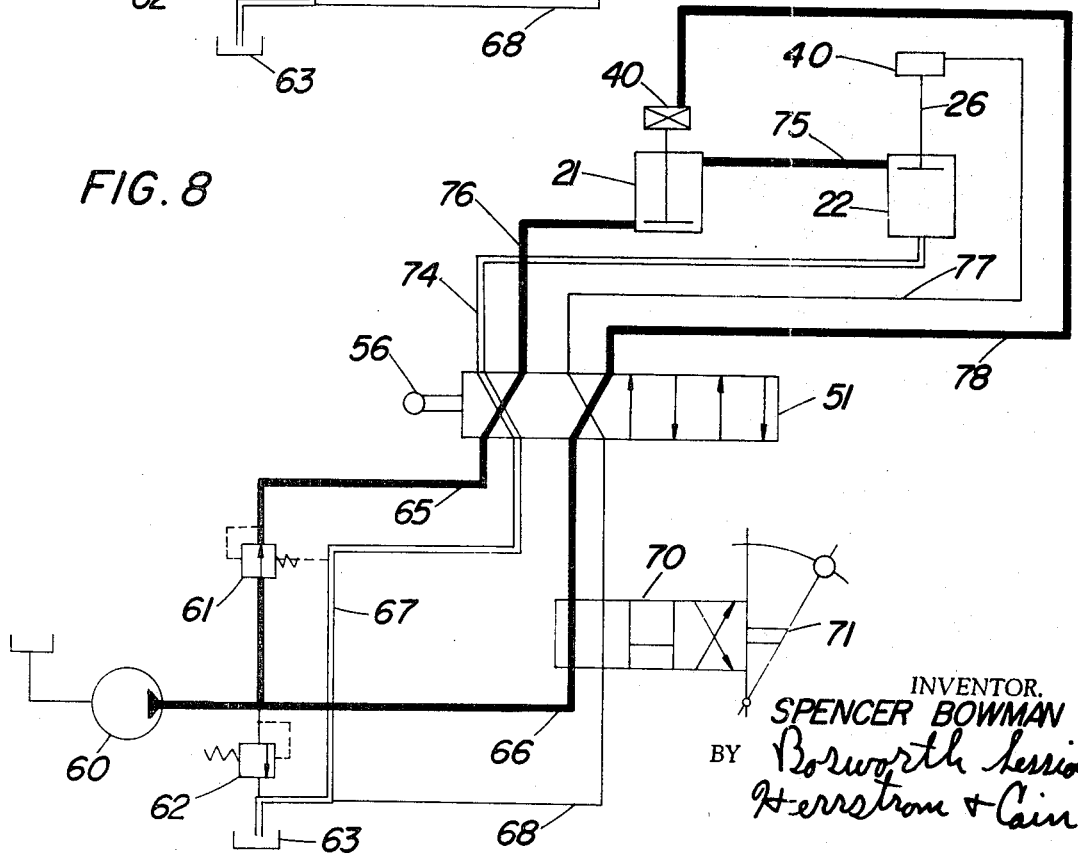

At the end of the drive stroke of the cylinder 22 and the simultaneous retraction stroke of the cylinder 21 the trip arm 52 will actuate the over-center trip device 53 to move the control valve spool 51 to the position shown in FIG. 8. In this position fluid in the line 65 will be passed through the control valve 50 to the line 76 to move the piston rod 25 through its extension stroke while positively exhausting fluid from the cylinder 21 through the connecting line 75 to the forward end of the cylinder 22. Thus the piston rod 26 of the cylinder 22 will be moved through a return stroke and fluid from the rearward end of the cylinder 22 will be exhausted through line 74 to the control valve 50 and thence to the reservoir 64 through the line 67. At the same time fluid pressure in the line 66 will be directed by the control valve 50 through the line 78 to the clutch cylinder 40 at the end of the piston rod 25 so that the respective clutch jaws 68 and 69 will be engaged during the drive stroke of the cylinder 21 to continue clockwise movement of the clutch rim 17. In the meantime the clutch jaws 38 and 39 of the piston rod 26 will be released and hydraulic fluid therein will be returned through the line 77 to the control valve 50 and thence through the selector valve 70 to the reservoir 63.

At the end of this stroke of the respective pistons 21 and 22, the trip arm 52 will again actuate the over-center trip device 53 and the spool 51 will again move to the position shown in FIG. 8 to repeat the cycle. The repetition of the cycle described causes a continual driving of the slewing ring 13 to carry the crane boom through a desired arc.

As soon as the desired position is reached the operator moves the selector valve 70 to the center position (not shown) which stops the operation of the cylinders 21 and 22 with one pair of clutch jaws engaging the rim. This very positively locates the slewing ring 13 in this position without the use of separate brakes. The speed of operation may be controlled by merely controlling the speed of the pump 60 using conventional controls normally available in the operator's cab.

Figure 9:
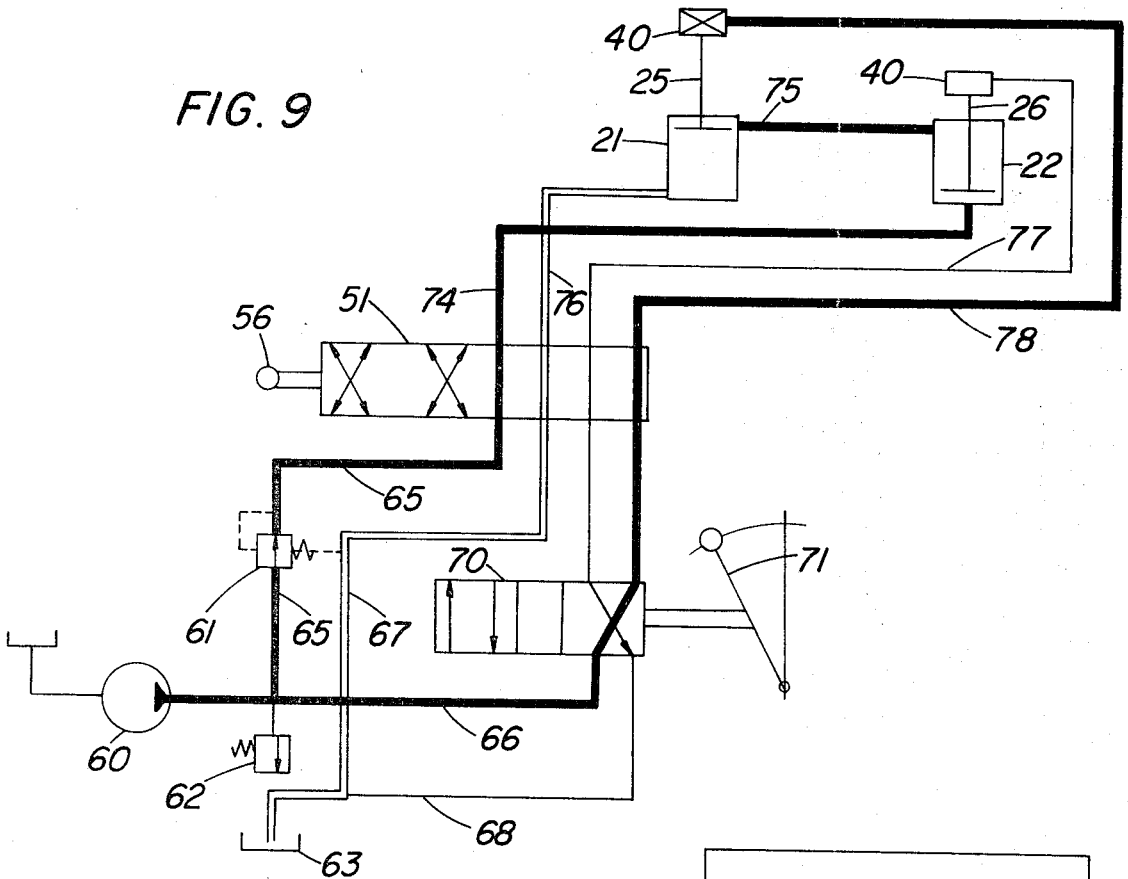
Figure 10:
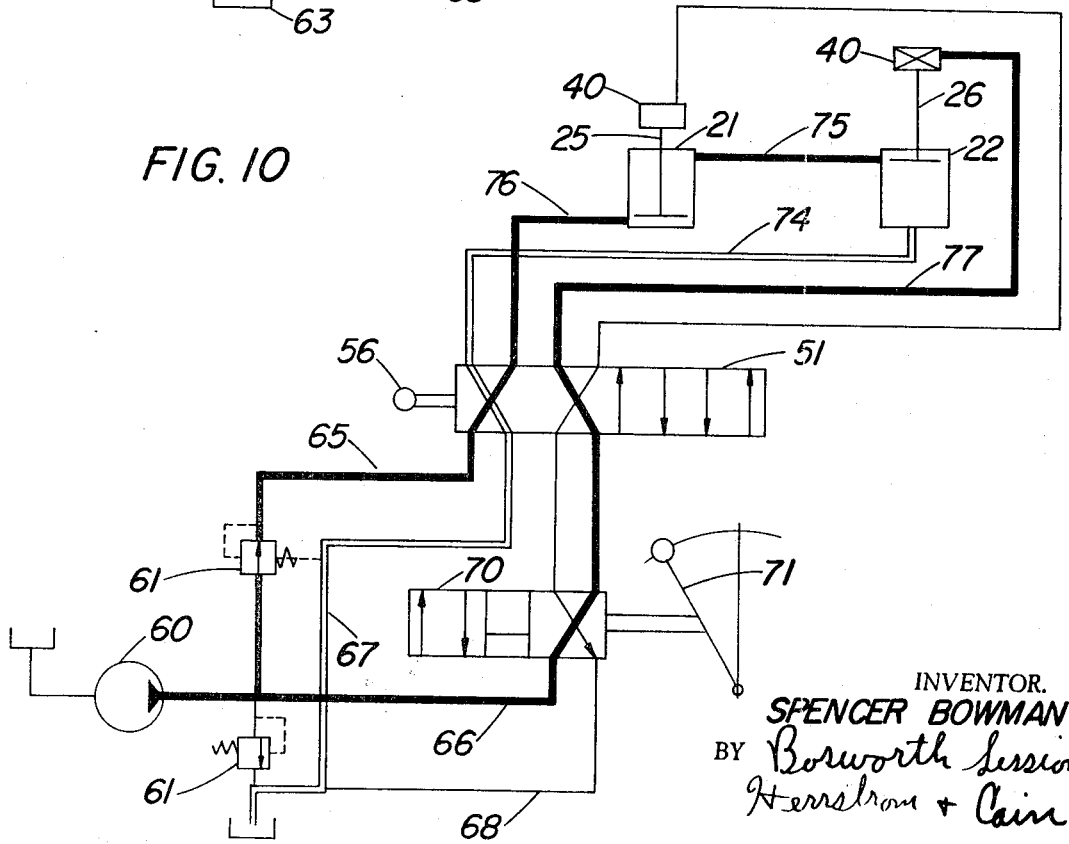

FIGS. 9 and 10 show the selector valve 70 move to its reverse position whereby the clutches on the ends of the piston rods 25 and 26 respectively will be engaged during the respective retraction strokes rather than the extension strokes. Accordingly the clutch rim 17 and slewing ring 13 will be turned in a counterclockwise direction as viewed in FIG. 2 during the retraction stroke of the piston rod 25 (FIG. 10) and vice versa (FIG. 9). It will be seen that the full range of speeds may be used during either forward or reverse swinging of the crane boom B with fine vernier adjustment being possible merely by reducing the speed of the pump 60.

As indicated, the drive cylinders 21 and 22 are connected by the hydraulic line 75 to provide transfer of fluid and relay of pressure from one cylinder to another so that during each phase of the cycle the length and duration of the piston strokes will be the same. Any leakage of fluid from the cylinders will be compensated for by means of a small ball valve 80 located in a passage extending through each piston 24. Accordingly any loss of fluid can be made up for by fluid passing through the piston 24 from the pressure side thereof. This leakage compensation is particularly important since any variation in the length and duration of the respective piston strokes would result in uneven operation and a non-uniform slewing ring travel.

The embodiments shown in the drawings and described above are for the purpose of explanation and illustration of a preferred form of my invention without intent to limit the scope of my patent to the form or forms therein specifically disclosed nor in any manner inconsistent with the progress by which the art has been promoted by the invention.

I claim:

1. A drive for a high inertia load comprising a clutch rim operatively connected to said load, a pair of spaced fluid operated drive cylinders with associated pistons and rods, a friction clutch carried on each of said piston rods for selectively gripping said clutch rim, fluid cylinders for operating said friction clutches between a disengaged position and a rim clutching position, means for supplying fluid pressure to said cylinders, and a control valve having a first position wherein said fluid pressure is switched to one drive cylinder and to its respective clutch jaw operating cylinder, and a second position wherein said fluid pressure is switched to the other drive cylinder and to its respective clutch jaw operating cylinder, and trip means operatively connected to one of said piston rods for switching of said control valve between its first and second positions at the end of each power stroke, for alternately driving one piston rod with its respective friction clutch in clutching engagement with said rim while returning said other piston rod with its respective friction clutch disengaged from said clutch rim to advance said load with uniform alternating drive strokes.

2. A drive for a high inertia rotary load comprising an annular clutch rim operatively connected to said rotary load, a pair of circumferentially spaced fluid operated drive cylinders, each having a piston rod adapted for reciprocating travel generally tangential to said clutch rim, a friction clutch carried on each of said piston rods for selectively gripping said clutch rim, fluid cylinders for operating said friction clutches between a disengaged position and a rim clutching position, means for supplying fluid pressure, a control valve having a first position wherein said fluid pressure is switched to one drive cylinder and to its respective clutch jaw operating cylinder, and a second position wherein said fluid pressure is switched to the other drive cylinder and to its respective clutch jaw operating cylinder, and trip means operatively connected to one of said piston rods for switching of said control valve between its first and second position at the end of each power stroke, for alternately driving one piston rod with its respective friction clutch in clutching enagement with said rim while returning said other piston rod with its respective friction clutch disengaged from said clutch rim to advance said load with uniform alternating drive strokes.

3. A drive as defined in claim 2 including an open-center 4-way valve for controlling the direction of drive of said rim and for positively stopping the movement thereof.

4. A drive as defined in claim 2 including a pair of opposed clutch jaw carriers operatively connected to the end of each piston rod, said jaw carriers being pivotally connected at their inner ends to their respective clutch jaw cylinder for pivotal movement toward and away from one another and each jaw carrier having a clutch jaw at its outer end, one on each side of said clutch rim, and a pair of toggle links pivotally connected at their inner ends to the piston rod of said clutch jaw cylinder and at their oppositely extending outer ends to their respective clutch jaw carriers intermediate the ends of said clutch jaw carriers.

5. Apparatus as defined in claim 2 wherein said drive cylinders are connected to one another at corresponding ends thereof by a fluid line to transfer fluid and to relay pressure from one cylinder to another and vice versa during each power stroke of each cylinder.

References Cited

UNITED STATES PATENTS

| | | | |
|---|---|---|---|
| 2,715,944 | 8/1955 | Dohrer | 74—128 |
| 2,947,187 | 8/1960 | Graff et al. | 74—129 |
| 3,142,199 | 7/1964 | Burton et al. | 74—520 |
| 3,200,597 | 8/1965 | Stotz | 74—520 |
| 3,213,707 | 10/1920 | McCann et al. | 74—520 |
| 3,433,018 | 3/1969 | Goehler | 60—54.5 |
| 3,230,717 | 1/1966 | Alden | 60—54.5 |
| 1,556,582 | 10/1925 | Booth | 74—144 |
| 3,189,368 | 6/1965 | Petersen | 74—144 |
| 3,237,734 | 3/1966 | Jania | 192—85 |

WESLEY S. RATLIFF, Jr., Primary Examiner

PO-1050
(5/69)

UNITED STATES PATENT OFFICE
CERTIFICATE OF CORRECTION

Patent No. 3,535,945      Dated October 27, 1970

Inventor(s) Spencer Bowman

It is certified that error appears in the above-identified patent and that said Letters Patent are hereby corrected as shown below:

Delete "jaw" at:

Column 5, line 70 (Claim 1);

Column 6, line 3 (Claim 1);

Column 6, line 23 (Claim 2);

Column 6, line 25 (Claim 2).

Column 6, line 38 after "2" insert --wherein said friction clutches include clutch jaws and further--.

Column 6, line 41 replace "jaw" with --operating--.

Column 6, line 46 replace "jaw" with --operating--.

Signed and sealed this 26th day of October 1971.

(SEAL)
Attest:

EDWARD M. FLETCHER, JR.
Attesting Officer

ROBERT GOTTSCHALK
Acting Commissioner of Patents